United States Patent [19]

Fujii et al.

[11] Patent Number: 4,467,348
[45] Date of Patent: Aug. 21, 1984

[54] IMAGE RECORDING DEVICE

[75] Inventors: Motoharu Fujii, Tokyo; Noboru Koumura, Narashino; Yasushi Sato, Kawasaki; Naoki Ayata, Yokohama; Seiji Saito, Yokosuka, all of Japan

[73] Assignee: Canon Kabushiki Kaisha, Tokyo, Japan

[21] Appl. No.: 228,732

[22] Filed: Jan. 27, 1981

[30] Foreign Application Priority Data

Feb. 1, 1980 [JP] Japan .................................. 55-11335
Feb. 4, 1980 [JP] Japan .................................. 55-12252
Feb. 4, 1980 [JP] Japan .................................. 55-12251
Mar. 10, 1980 [JP] Japan .................................. 55-30083

[51] Int. Cl.$^3$ .............................................. H04N 1/26
[52] U.S. Cl. ........................................ 358/78; 358/75; 358/280; 358/293
[58] Field of Search ........................ 358/17, 19, 22, 75, 358/76, 78, 80, 148, 149, 280, 160, 183, 293; 360/36

[56] References Cited

U.S. PATENT DOCUMENTS

| | | | |
|---|---|---|---|
| 3,958,232 | 5/1976 | Hobrough et al. | 358/183 |
| 4,058,828 | 11/1977 | Ladd | 358/78 |
| 4,134,131 | 1/1979 | Hopkins | 358/149 |
| 4,134,135 | 1/1979 | Inokuchi et al. | 358/293 |
| 4,169,275 | 9/1979 | Gunning | 358/280 |
| 4,259,696 | 3/1981 | Paranjpe et al. | 358/293 |

OTHER PUBLICATIONS

Ishizawa et al., "Kanebo's Knit Pattern Information Processing System", *Knitting Times*, Feb. 9, 1976, pp. 55–59.

*Primary Examiner*—Tommy P. Chin
*Attorney, Agent, or Firm*—Fitzpatrick, Cella, Harper & Scinto

[57] ABSTRACT

There is an image recording device for obtaining a multi-color recorded image by means of a plurality of recording heads for different colors. The image recording device is constructed with a color signal forming device to form, by scanning an original image, a plurality of electrical color signals corresponding to a plurality of mutually different colors, a plurality of recording members to perform recording on a recording medium with colors corresponding to the plurality of colors, and selection device to select whether the color signals are to be applied to a recording member in colors corresponding to those of the color signals, or they are to be applied to a recording member in colors not corresponding to those of the color signals.

9 Claims, 10 Drawing Figures

| COPYMODE SELECTION SW | DATA GENERATOR (157) | | | | | | | ORIGINAL BLACK | ORIGINAL RED |
|---|---|---|---|---|---|---|---|---|---|
| | A2 | A1 | A0 | X3 | X2 | X1 | X0 | | |
| 1 | O | O | O | — | O | O | O | BLACK RECORD | RED RECORD |
| 2 | O | O | — | — | — | O | — | BLACK RECORD | BLACK RECORD |
| 3 | O | — | O | — | — | O | O | BLACK RECORD | (NO RECORD) |
| 4 | O | — | — | O | — | — | — | RED RECORD | RED RECORD |
| 5 | — | O | O | — | O | — | O | (NO RECORD) | RED RECORD |
| 6 | — | O | — | — | — | — | O | (NO RECORD) | BLACK RECORD |
| 7 | — | — | O | O | O | O | O | RED RECORD | BLACK RECORD |

FIG. 10

IMAGE RECORDING DEVICE

BACKGROUND OF THE INVENTION

1. Field of the Invention

This invention relates to an image recording device such as copying apparatuses, facsimiles, and so forth to copy or duplicate original documents. More particularly, the invention is concerned with a device for obtaining a multi-color recorded image by means of a plurality of recording heads for different colors disposed at different positions in the device, and by reading a plurality of different color information signals or introducing such signals from outside as inputs.

2. Description of the Prior Art

In recent years, there has been proposed an image forming device in which information from an original image are read out in bit unit by, for example, a self-scanning type light receiving element, etc., and then the information as read are converted into electrical signals, and the final image is digitally recorded in accordance with the thus converted signals. As the recording method thereof, there has been known the ink jet recording method.

When multi-color recording is to be carried out by the ink jet recording method, it is a usual practice to perform such recording with a plurality of (groups of) recording heads in conformity to the number of colors to be recorded (for example, with two sets of recording heads, one for red and the other for black, in the case of two-color recording in red and black), since it is difficult to do such polychromatic recording with a single (group of) recording head from the standpoint of feeding inks in various colors to the recording head.

In practicing the abovementioned multi-color recording, these two sets of recording heads cannot be too closely disposed. The reasons for this are that a certain degree of space interval is required between the heads for the sake of maintenance of the heads and due to bulkiness of the heads per se, a certain distance should be provided between the heads in accordance with the time period required for the ink in one color to dry up when it is recorded on a recording sheet so as to prevent mixing of red and black inks due to running, etc.

Accordingly, when the recording is to be done by simultaneously driving the two sets of red and black heads, it should be done by reading the information at two different points on the original, which correspond to the space interval between the heads and then transferring the signals as read out to the recording heads, not by recording the information at one and the same position on the original, while reading them.

On the other hand, as the method for reading the original in a bit unit and discriminating between red and black, there has been known a method of color discrimination by a color separation system such as, for example, a beam splitter, etc. This method is to split one and the same point on the original by means of the beam splitter into particular bands of spectroscopic wavelength, and to obtain intensity in the spectroscopic wavelength by light receiving elements for each of the spectroscopic wavelength bands as split.

Therefore, as the method for dichromatic recording using the ink jet heads and the abovementioned color separation system, there may be contemplated one method, wherein a two color splitting system is used for reading two points (or lines) on an original image corresponding to the space interval between two sets of the recording heads.

According to this method, however, two pieces of the light receiving element are required for each set of recording heads, hence, a total of four pieces (2 pieces×2 sets) of recording heads are required, thereby creating various disadvantages such as, a requirement for more space for accommodating these light receiving elements, the necessity for a more complicated circuit construction for driving these light receiving elements, and an increase in the working steps required for adjusting the positions for installing these light receiving elements etc. Furthermore, in a device which records external input signals in different colors at different positions, it is necessary that one of the color signals should be delayed for a space interval between the recording heads with the consequence that the address operations for writing and reading image information into and out of the recording device becomes disadvantageously complicated.

SUMMARY OF THE INVENTION

It is therefore an object of the present invention to provide an image recording device capable of recording an image original in a plurality of colors in accordance with a plurality of color signals as read out of the image original.

It is another object of the present invention to provide an image recording device capable of readily performing the address operations for recording and reading the color signals to be applied to recording members disposed at different positions into and out of a memory.

It is still another object of the present invention to provide an image recording device capable of easily recording an image original in different colors from those read out of the image original.

It is yet another object of the present invention to provide an image receiving device having extremely good operational functions and being simple in construction.

BRIEF DESCRIPTION OF THE DRAWINGS

FIG. 10 is a table showing combinations for color conversion.

DESCRIPTION OF THE PREFERRED EMBODIMENTS

The present invention will now be explained in detail in reference to the above-described accompanying drawing.

Figure 1:
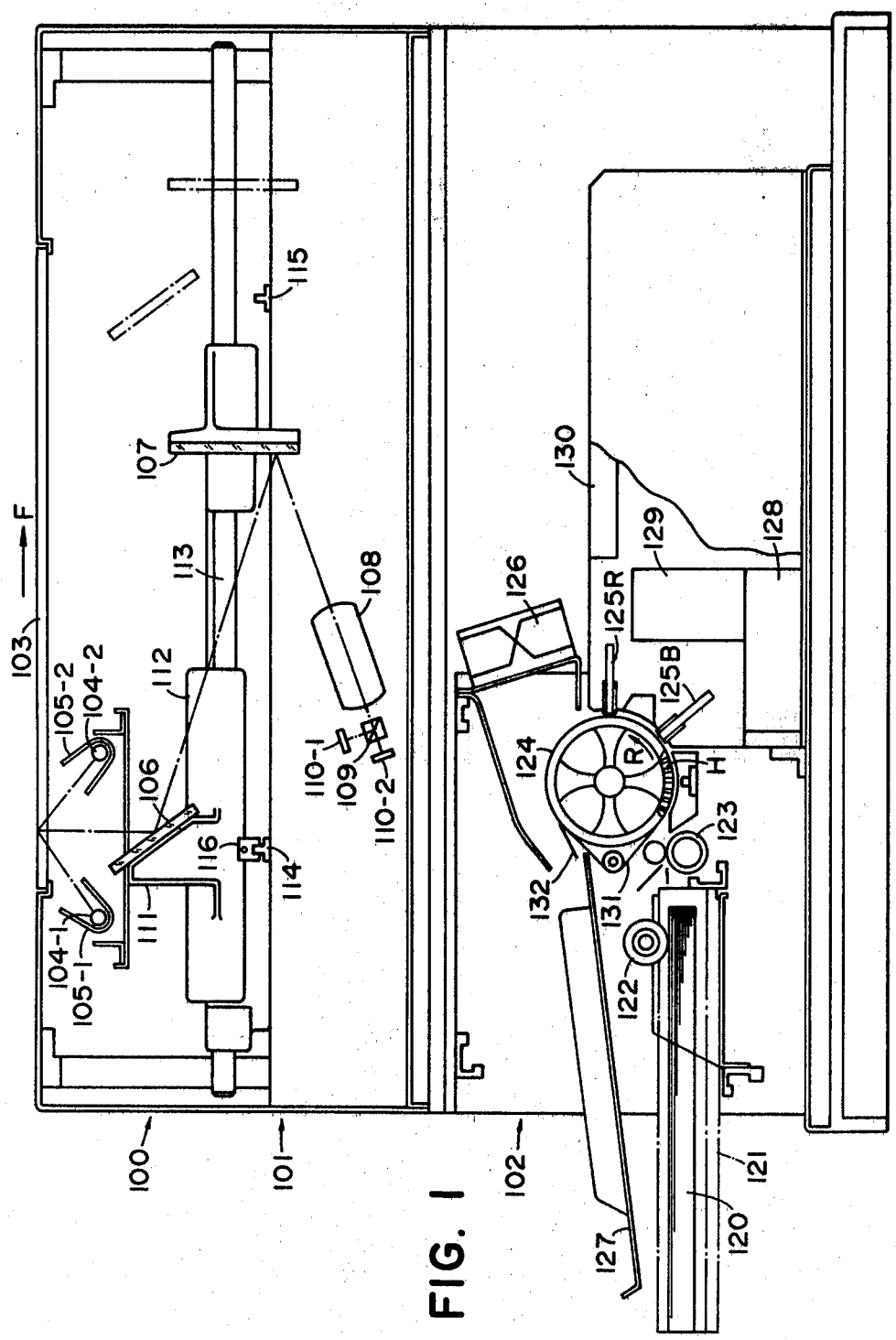
FIG. 1 is a longitudinal cross-section of an image recording device which adopts the concept of the present invention.

FIG. 1 illustrates a general construction of a reproduction device having a reading section. In the drawing, the reproduction device 100 is constructed with a reading section 101 to read out information carried on the surface of an image original, and a writing section 102 to write the information as read out onto a recording medium such as paper, etc.

An image original placing table 103 made of glass, etc. is provided on the top part of the reading section 101, on which an image original to be reproduced is mounted. Below the image original placing table 103, there are disposed various component elements for the reading operation such as rod-shaped light sources 104-1, 104-2, for example, a fluorescent lamp, to illuminate the image original; reflection mirrors 105-1, 105-2 disposed in such a manner that light emitted from the light sources 104-1, 104-2 may effectively irradiate the surface of the image original mounted on the image original placing table 103; first and second planar mirrors 106, 107 to scan (auxiliary scan) the image original; an optical lens 108 to focus light image on the image original surface; a beam splitter 109 for color separation; self-scanning type light receiving elements 110-1, 110-2 consisting of a multitude of rectilinearly arranged light receiving components; and various others.

The light sources 104-1, 104-2, the reflection mirrors 105-1, 105-2, and the first planar mirror 106 are integrally assembled on a supporting member 111 which, in turn, is fixed on a base 112. The base 112 performs forward movement, on and along a guide rail 113 from left to right (F-direction) and return movement from right to left, as seen in the drawing.

The second planar mirror 107 moves on and along the guide rail 113 in the same direction as the first planar mirror 106, but at a moving speed half that of the first planar mirror 106. That is, at the scanning in its forward movement, the planar mirrors 106, 107 shift to their positions shown in dot-and-dash lines in the drawing. At this instant, a light path length from the image original placing table 103 to the lens 108 through the planar mirrors 106, 107 is always maintained constant.

The principal scanning direction of the light receiving elements 110-1, 110-2 is normal to the surface of the drawing sheet. Therefore, if signals from the light receiving components in the light receiving elements 110-1, 110-2 are read out in good sequence during shifting of the planar mirrors 106, 107, there can be obtained sequentially from the light receiving elements 110-1, 110-2 those signals which have raster-scanned the image original surface.

Detectors 114, 115 for detecting, respectively, a home position and a return position of the movable mirrors are provided at their respectively designated positions in the reading section 101 as shown in FIG. 1. Incidence of light into each of the detectors is allowed and hindered by a light intercepting means 116 mounted on the base 112 for the first planar mirror 106. For the detectors 114, 115, there may be adopted, for example, photo-switches.

Two light receiving elements are disposed in the reading section 101 in conformity to the arrangement of the writing heads for printing two colors, e.g., red and black, in the writing section 102 to be described later. These two light receiving elements are disposed on the extensions of the optical axis of the lens 108.

The beam splitter 109 is provided at the back of the lens 108 in the light path of the incident light to be projected into the light receiving elements 110-1, 110-2 so that light coming through the lens 108 may focus the image information to be read out of the image original surface on the light receiving surface of each of the light receiving elements 110l-1, 110-2.

The beam splitter 109 is composed of a dichroic mirror which transmits short wavelengths (blue side) in the visible light region and reflects long wavelengths (red side), when dichromatic recording in red and black, for example, is to be performed. By this dichroic mirror and two light receiving elements 110-1, 110-2, the red and black signals are differentiated, and respectively transferred to a red writing head and a black writing head in the writing section 102.

In the foregoing explanations, the general concept of the dichromatic recording in red and black has been given for the sake of simplicity and convenience. However, the present invention is not limited to such dichromatic recording in red and black, but any other two colors may be arbitrarily combined, or three or more colors may be combined.

In the case of using two colors other than red and black, the dichroic mirror to be used is such a one that transmits light in a particular wavelength region in the visible light and reflects light in other wavelength regions so as to be able to differentiate the two colors by the two light receiving elements 110-1, 110-2.

Further, instead of using the dichroic mirror for the beam splitter 109 as shown in FIG. 1, there may be adopted a construction, wherein a half mirror is employed and a predetermined color filter is provided for each light receiving element, either in the light path between the half mirror and the light receiving surface of the light receiving elements 110-1, 110-2, or at the light receiving surface side of the light receiving elements 110-1, 110-2, or at the light projecting side of the half mirror, thereby differentiating the two colors.

In the writing section 102 of the reproduction device 100 in FIG. 1, there are accommodated a paper feeding cassette 121 to store therein recording paper 120 as a recording medium; a paper feeding roller 122 and a timing roller 123 for feeding the recording paper feeding cassette 121 in the direction of its conveying path; a rotational drum 124 mounted in a rotatable condition to convey the recording paper at the time of recording operation by winding it up on its rotating surface; two sets of ink jet heads 125B, 125R for printing in black and red; a fan 126 for dessicating the ink put on the recording paper; a paper receiving tray 127; a black ink reservoir 128 for feeding the black ink; a red ink reservoir 129 for feeding red ink to the ink jet head 125R; and a driving section 130 accommodating therein a drive circuit for driving the two sets of heads 125B, 125R.

A multitude of suction holes H are formed in the surface of the rotational drum 124, which are arranged with very small space intervals among them. Through these tiny holes, air within the drum 124 is sucked in and discharged outside by a well known suction device (not shown) when the drum is rotated at a constant speed in the direction R in the drawing by a driving source (not shown).

The recording paper which has been led to the rotational drum 124 by the paper feeding roller 122 and the timing roller 123 is wound on the drum by these suction holes, and, while it is rotating together with the drum 124, there is effected the writing of the information by the two sets of recording heads 125B, 125R in accordance with the signals as read from the reading section 101. A portion of the paper, on which the writing has been completed, moves upward of the drum 124, in the drawing, and the paper is separated from the surface of the drum 124 by means of a separating belt 131 and a separating claw 132, and is received into the paper receiving tray 127.

A fan 126 operates depending on necessity, and functions to compulsorily dry the ink placed on the recording paper, when it reaches the upper part of the drum 124, in the drawing, after completion of the writing operation to quicken semipermanent adhesion of the ink to the recording paper and to assist conveyance of the recording paper toward the paper receiving tray 127.

The ink jet heads 125B, 125R are full line multi-heads arranged in a row, in a length corresponding substantially to the width of the recording paper, with a density equal to a resolution required of the discharging orifices of the ink jet heads.

Accordingly, the principal scanning direction of the self-scanning type light receiving elements and the direction of the discharge orifice arrangement in the full line multi-ink jet heads, as well as the auxiliary scanning direction F on the surface of the image original and the rotational direction R of the recording paper, are respectively coincident. Therefore, when the image information is written in the recording paper on the rotational drum 124, while scanning the image original surface, there can be obtained a reproduction of the image original.

The ink jet head 125B is for black printing and the ink jet head 125R is for red printing. The space interval between these heads is given a distance D in terms of a space interval between the black and red ink droplets to touch on the recording paper. The heads are disposed over and against the outer periphery of the drum 124. It is therefore necessary that the red information read out of one and the same scanning line position on the image original placing table 103 be delayed by the number of the scanning lines corresponding to the distance D on the recording paper, and be transmitted to the ink jet head 125R for red printing.

The beam splitter 109 in the optical system of the embodiment as shown in FIG. 1 is composed of a dichroic mirror which transmits the short wavelengths (blue side) in the visible light region, and reflects the long wavelengths (red side).

The light receiving elements 110-1, 110-2 are constructed with CTD (Charge Transfer Device) image sensors such as, for example, a single dimensional CCD (Charge Coupled Device) image sensor, a single dimensional BBD (Bucket Brigade Device) image sensor, etc., all being self-scanning; a thin film, single dimensional image sensor with its light receiving section being composed of amorphous silicon; a chalcogen type single dimensional image sensor with its light receiving section being composed of Se-Te; and various others. Selection of the wavelength is so performed that light of the long wavelength region may reach the light receiving element 110-1, and light of the short wavelength region may arrive at the light receiving element 110-2.

The method of detecting black and red colors with these two light receiving elements 110-1, 110-2 is as follows. Since only light rays in the long wavelength region enter the light receiving element 110-1, it is sensitive to the red image original and the white background (where no image information exist) and insensitive to the black image original, hence differentiation of black is possible in accordance with the method to be described later. On the other hand, only light rays in the short wavelength region enter the light receiving element 110-2, so that it has sensitivity to the white background, but no sensitivity to the black and red image originals. Since the color information sensitized by the light receiving element 110-1 and desensitized by the light receiving element 110-2 is red, this light receiving element 110-2 is capable of detecting red.

In order to differentiate the black signal by the light receiving element 110-1, an electrical circuit may be designed in such a manner that, when the light reflected from the image original surface after the light scanning enters the light receiving element, no write-in signal output may be produced in case the light receiving element 110-1 indicates sensitivity, but the write-in signal output may be produced only when the light receiving element does not indicate sensitivity to the incident light, because, as already mentioned in the foregoing, the light receiving element 110-1 is sensitize to the red signal and the white background but insensitive to the black signal.

Differentiation of the red signal by the light receiving elements 110-2, 110-1 can also be done in the same manner as mentioned above. That is to say, the electrical circuit may be so designed that the red write-in signal output is produced only when the light receiving element 110-2 is insensitive to the incident light and the light receiving element 110-1 is sensitive to it.

Figure 2:
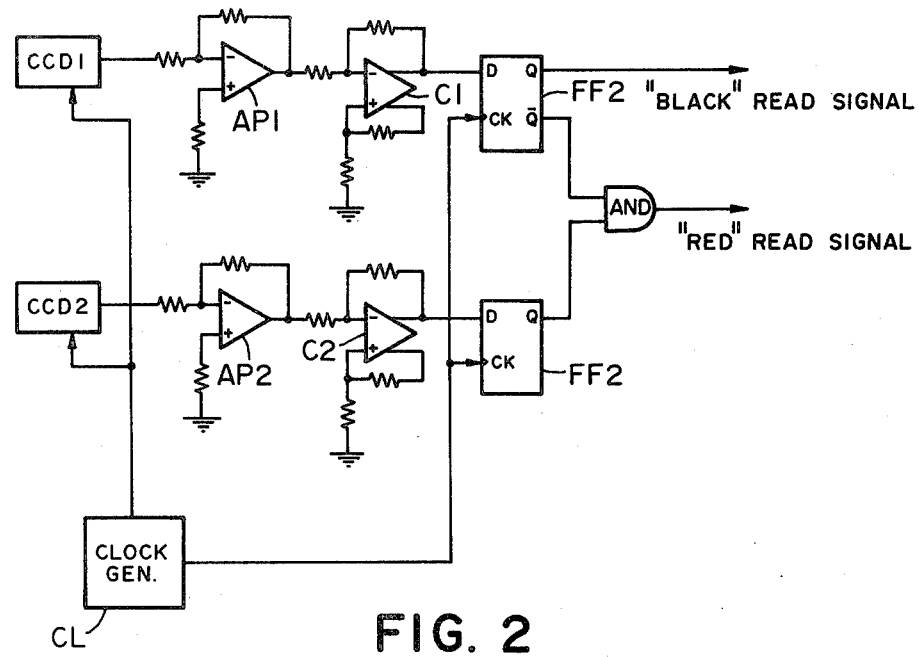
FIG. 2 is a block diagram showing a color signal forming circuit.

FIG. 2 is a schematic block diagram of an electrical circuit of the reading section to practice the present invention. Outputs from two CCD linear image sensors $CCD_1$, $CCD_2$ are amplified by amplifiers $AP_1$, $AP_2$, respectively, after which the presence or absence of sensitivity in each CCD, i.e., the image information, is quantized by respective comparators C1, C2. The quantized data are introduced as inputs into corresponding D-input terminals of D-type flip-flop circtuis $FF_1$, $FF_2$ and held therein by a timing signal generated from a clock circuit CL. An output Q from the flip-flop $FF_1$ is produced as the black signal as it is, while an output OVS/Q/ from the flip-flop $FF_1$ and an output Q from the flip-flop $FF_2$ detect the red signal by means of an "AND" circuit AND, and are produced as a red signal output.

Figure 3:
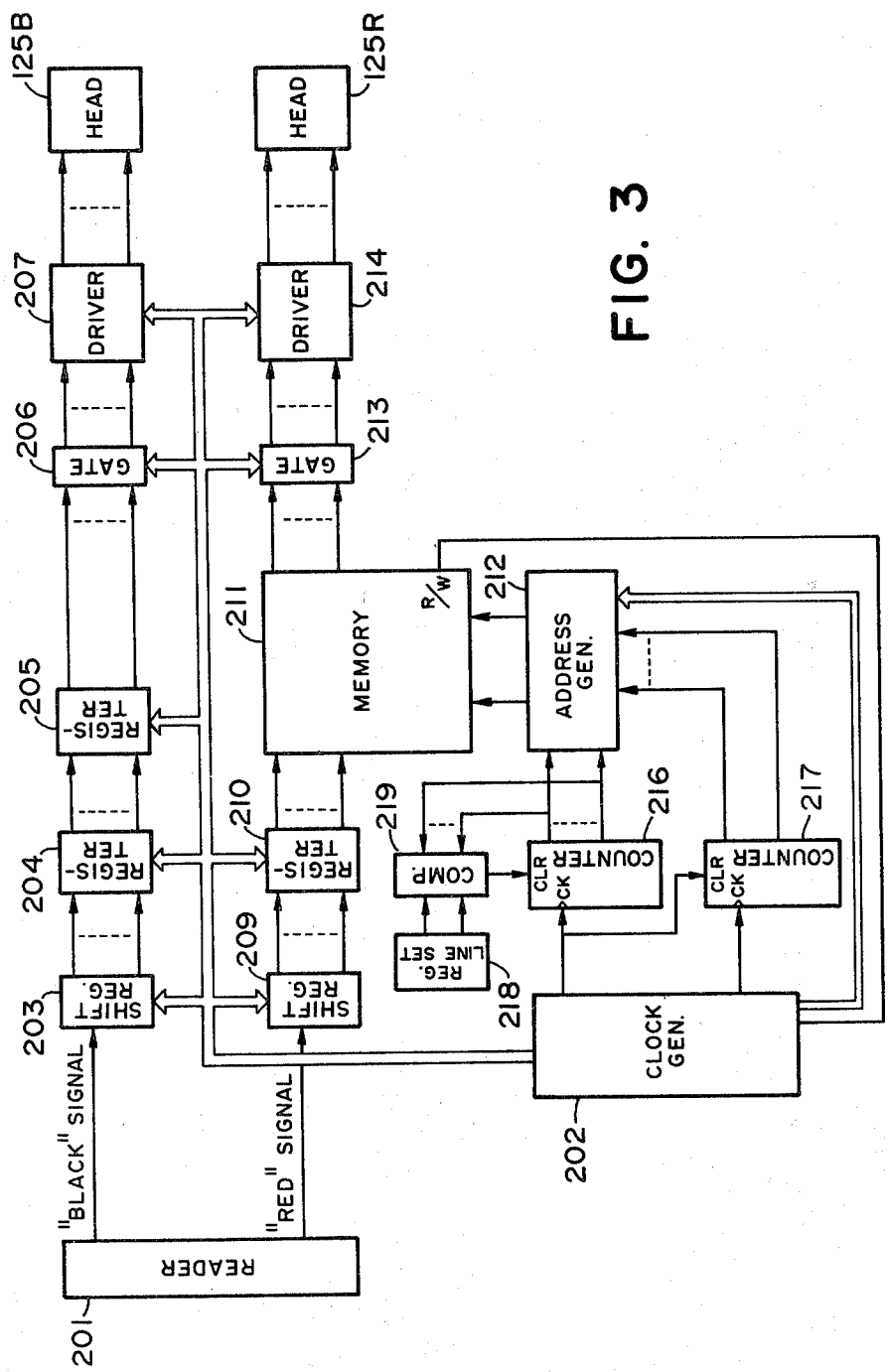
FIG. 3 shows one embodiment of a record control circuit for the image recording device.

FIG. 3 is a block diagram to illustrate an input-output signal control system, wherein the input and output data are black and red signals. A document reader 201 in FIG. 3 reads the black and red information signals on the image original by the method as explained with reference to FIG. 2, and produces these signals as outputs therefrom. The black signal from the document reader 201 is subjected to conversion of time-sequentially serial signals to parallel signals, e.g., signals in a 32-bit unit, by means of a shift register 203. The timing for the conversion is shifted by a clock signal from a clock circuit 202. The black signal which has been rendered the parallel signal is temporarily held in a register 204 in 32-bit unit. Since the black signal is produced as an output to the recording head 125B without delay, it may be gated for output as it is, although it is temporarily stored in a register 205 for adjustment of the timing. The black signal stored in the register 205 is produced as an output to a drive circuit 207 with the adjusted timing by opening of a gate 206. These timings are synchronized with a signal from the clock generating circuit 202. In the drive circuit 207, there are generated a voltage and a pulse width required for operating the black recording head 125B, thereby driving the black recording head 125B.

Figure 5:
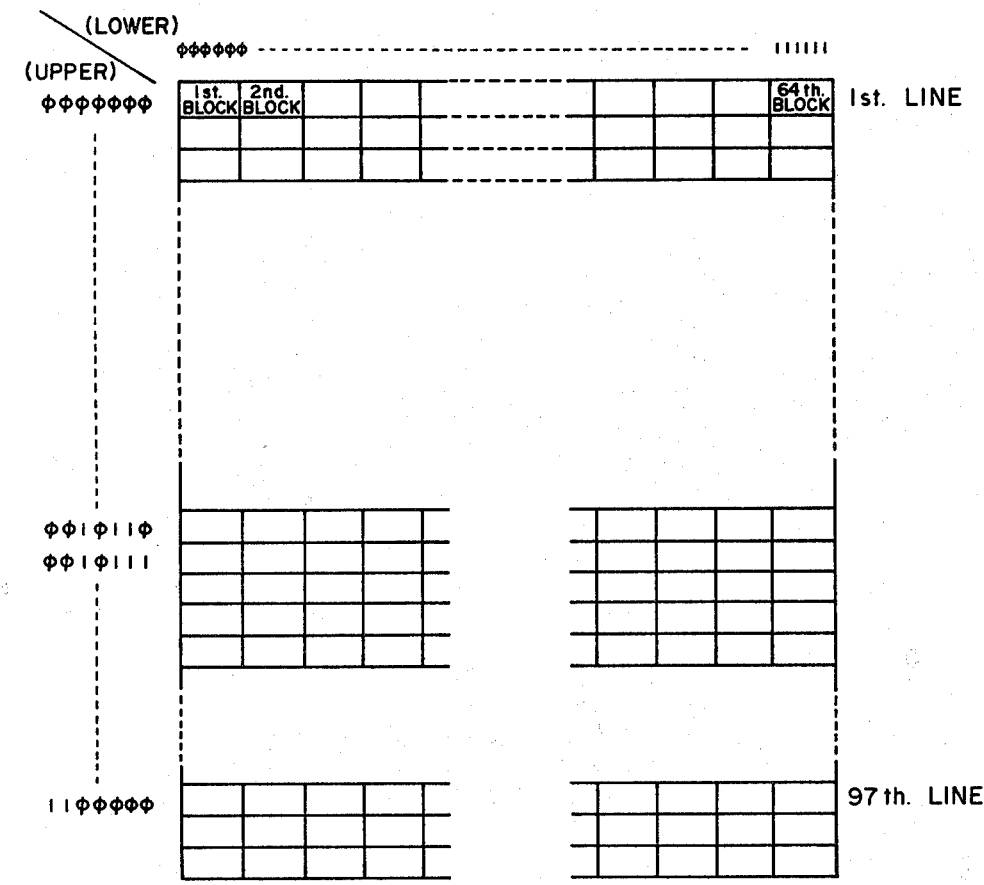
FIG. 5 is a diagram showing the memory.

In the following, explanations will be given as to the red signal. As already explained with reference to FIG. 1, the red recording head is provided apart from the black recording head. Accordingly, the red signal which has been read out of one and the same scanning line must be transmitted to the red recording head for recording with a delay from the black signal. The red signal which has been subjected to conversion from serial signals to parallel signals by the shift register 209 in FIG. 3 is once latched by a register 210, after which it is stored in a memory 211, while its timing is being adjusted. The memory 211 is constructed as shown in FIG. 5, and selects a block in the direction Y by an upper address and a block in the direction X by a lower address. The address of the memory is instructed from an address generating circuit 212. The red signal stored in the memory 211 is first produced as an output at an instant when the recording paper has moved by the space interval between the black and red recording heads. As in the black signal, the red signal passes through the gate 213 to be forwarded to the drive circuit 214 as an output therefrom, whereby the red information is recorded on the recording paper by the red recording head 125R.

The address for writing and reading the red signal into and out of the memory 211 is generated from the address generating circuit 212, which is determined on the basis of the contents of a line counter 216 and a block counter 217. A line start signal (line synchronous signal) is generated for each line from the clock generating circuit 202. The line start signal is counted by a line counter 216. When the count proceeds to a desired line number, e.g., 97, set in a line set register 218, the line counter 216 is cleared by a signal from a line number comparison circuit 219, and starts counting the line number again from zero. The line set register 218 is constructed with a digital setting device, etc., and is able to manually set an arbitrary digital value. Therefore, by appropriate setting of the digital value, the starting time for the red recording can be selected. The signal for one line is sequentially transmitted to the recording head in a 32-bit unit, i.e., for each block. From the clock generating circuit 202, clocks for 32 bits are generated as an output to a block counter 217. As a consequence of this, the block synchronous signal. The address generating circuit 212 generates the address on the basis of the contents of the line counter 216 indicating the line position and the block counter 217 indicating the block position. In other words, when, for example, a value of the line counter 216 is set in the upper bit, and a value of the block counter 217 in the lower bit, the one line information can be distributed in an integral region on the memory. The block position changes within one line. That is to say, as the contents of the block counter 217 change, the address in the memory is also controlled automatically. Similarly, when the line counter 216 changes, a different memory address will be designated even at the same block position. Accordingly, when a line value for the memory writing and a line value for the memory reading are separately generated in the address generating circuit 212 based on the contents of the line counter 216, the memory address can be automatically controlled for each of the writing and reading of the memory. This operation will be explained in reference to FIGS. 4 and 5.

Figure 4:
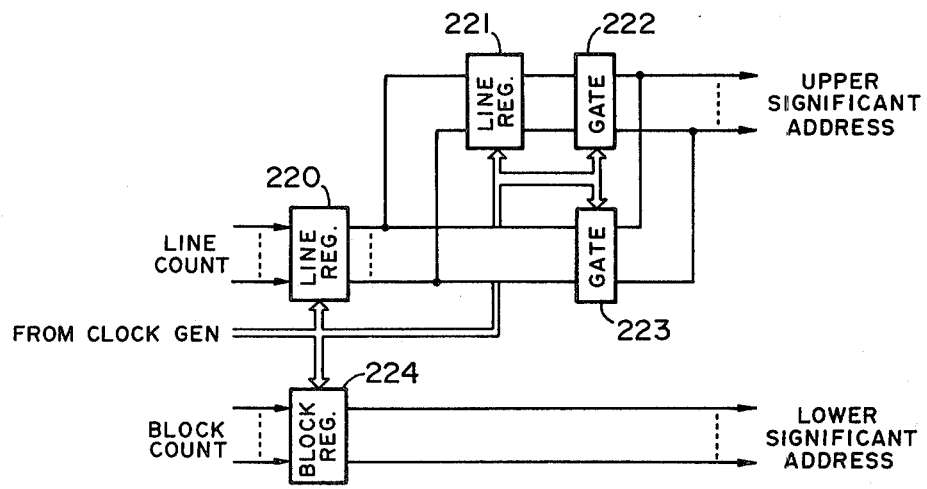
FIG. 4 shows a schematic block wiring diagram for a memory address circuit.

FIG. 4 is a diagram for explaining details of a part of the address generating circuit according to the present invention. FIG. 5 is a table showing distribution on the memory of addresses designated by the address generating circuit. In FIG. 4, a value from the line counter is once latched in a line register 220. The value is further latched in a line register 221 with a time delay for one line. Therefore, the line register 221 always indicates a line number which is less than that in the line register 220 by one line. The upper address at the time of writing into the memory produces an output value of the line register 221 by opening a gate 222, while the upper address at the time of the memory reading produces an output value of the line register 220 by opening a gate 223. That is to say, the upper address value of the memory is such that an upper address value greater than the upper address value for writing by one is designated at the time of reading. Accordingly, when the line has changed, and the subsequent line value is introduced as an input into the line register 220 from the line counter, the upper addresses for both reading and writing increase by one. The writing upper address at that time is a line value for reading the preceding line. That is, the upper address bit is so controlled that data for a new line may be written after the entire data has been read out of the memory, which was used for reading the preceding line. The value from the block counter is held in a block register 224, the content of which constitutes the lower bit of the memory address.

The memory address control as mentioned in the foregoing will now be explained in reference to FIG. 5 showing the memory 211. In the drawing, the vertical direction indicates the upper address, and the horizontal direction denotes the lower address. In the embodiment, one line contains data of 2048 bits, which are defined into 64 blocks, each containing 32 bits, and are stored in the memory. The space interval between the black head and the red head is 8 mm, and the resolution in the auxiliary scanning is 12 lines/mm, so that the line number in the space interval between the heads is 96 lines. In the memory shown in FIG. 5, the indication of "1100000" denotes the upper address at the 97th line. Accordingly, for the red signal, the data at the upper address position of the first line of "0000000" can be first read out each block, only when it is stored in the memory up to and including the 97th line. In the subsequent line signal, the red data is written in at the upper address position of "0000000", whereby the contents of the upper address position of "0000001" are read out as the data for the second line, and produced as an output. Reinstatement of the upper address to zero is effected by the comparison circuit 219 as explained with reference to FIG. 3.

As is understandable from the foregoing explanations, a difference in address between the writing address and reading address into and out of the memory can be adjusted by changing the line number to be reinstated (in other words, by changing the set number of lines in the line number comparison circuit), hence fine adjustment of the space interval between the heads can be done simply without relying on a mechanical expedient.

In the above-described embodiment, explanations have been made as to a case, wherein the image information are read out of the image original only when the planar mirrors 106, 107 are shifted in one direction, and no information is read out at the time of shifting the mirrors in another direction. It should, however, be noted that, by constructing the device in such a way that the image original information may be read by both the forward and return motions of the planar mirrors 106, 107, the reading speed, hence, the recording speed, can be remarkably improved.

Figure 6:
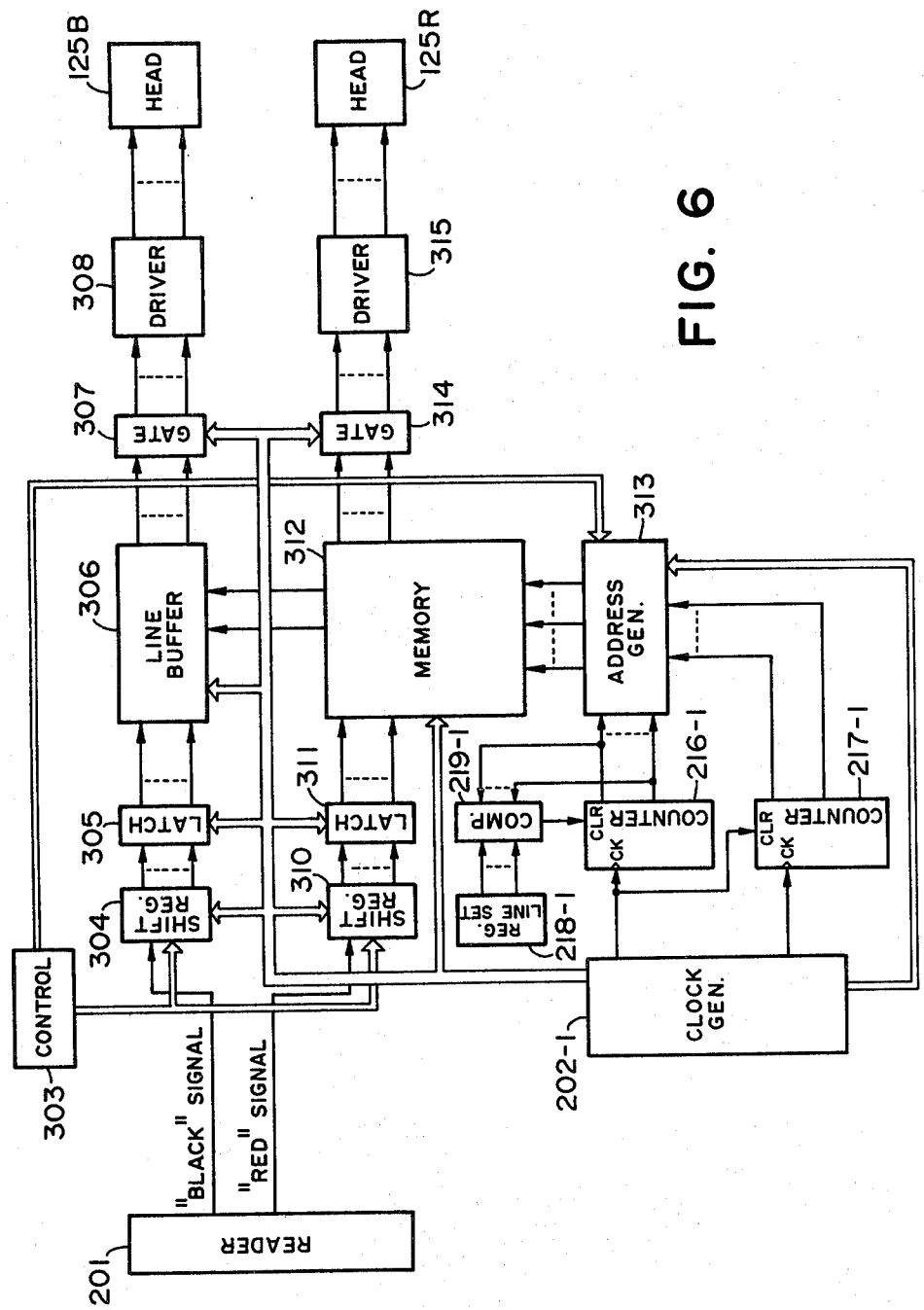
FIG. 6 shows circuit for the image recording device.

In the following, further explanations will be given as to such embodiment in reference to FIG. 6.

The black signal from the document reader 201 is subjected to conversion by a shift register 304 from time-sequential serial signals into parallel signals, e.g., block signals in 32-bit unit. The serial block data are arranged in the direction opposite to the direction F in FIG. 1 in its auxiliary scanning direction on the image original surface, i.e., they are arranged in the mutually opposite direction in the forward motion and the return motion. For instance, if, at the time of the forwarding motion, the serial signals are written during the right shifting, their writing, at the time of the return motion is done during the left shifting. Control of the shifting direction of the shift register 304 due to difference in the forward and return motions is done by a forward and return motion control circuit 303. The black signals which have been converted to the parallel signals by the shift register 304 are temporarily held in a latch circuit 305 in a 32-bit unit. The data as held is sequentially stored in a line buffer 306 on a temporary basis. The line buffer 306 consists of two line buffers, one of which is used for output, while the other is used for memory. Also, the auxiliary scanning direction of the image original, for example, is so controlled that, at the time of the forward motion, the input block data for one line may be produced as an output in the same sequence as in the write-in operation, while, at the time of the return motion, the output sequence of the block data may become opposite to the input sequence in one line. A difference in address between the input and the output is determined by a part of the bits from an address generating circuit 313, i.e., input-output block control bit. ter 304 and the latch timing gate 307 of the latch 305 are synchronized with a signal from a clock generating circuit 202-1. In a drive circuit 308, there are generated a voltage and a pulse width which are required for operating the black recording head 125B, whereby the black recording head 125B is driven.

In the following, explanations will be given as to the red signal. The red recording head is disposed apart from the black head as already explained with reference to FIG. 1. Accordingly, the red signal which has been read on one and the same scanning line should be transmitted for recording to the red head with a time delay from the black signal. The red signal which has been subjected to conversion by a shift register 310 in FIG. 6 from serial signals to parallel signals in the same way as in the black is once latched in a latch 311, after which it is stored in a memory 312 of the same construction as the abovementioned memory 211, while it is being subjected to timing adjustment. The shifting direction by the shift register 310 is determined in the same manner as by the shift register 304 in accordance with the instruction from a forward and return motion control circuit 303. Further, the address in the memory 312 is instructed to the address generating circuit 313. The red signal stored in the memory 312 is first produced as an output at the instant the recording paper moves for the space interval between the black head and the red head. The manner in which the red signal for one line is produced as an output differs, in the input and output sequences of the block, between the forward and return motions of the image original, as is the case with the black signal. The red signal output is forwarded to the drive circuit 315 through the gate 314, and the red information is recorded on the recording paper by the red recording head 125R.

The addresses for writing and reading of the red signal into and out of the memory 312 are generated from the address generating circuit 313, which are determined on the basis of the contents in the line counter 216-1 and the block counter 217-1. A start signal (line synchronous signal) is generated for every line from the clock generating circuit 202-1, and the line counter 216-1 counts the line start signal. When the counting proceeds to a desired line number, the line counter 216-1 is cleared with a signal from the line number comparison circuit 219-1 so as to count again the line number from zero. A line set register 218-1 is a preset switch for setting the line number corresponding to the space interval between the black head and the red head. Incidentally, it should be noted that the circuits designated by the same reference numerals as those in FIG. 3 operate in the same manner as already explained with reference to FIG. 3.

Figure 7:
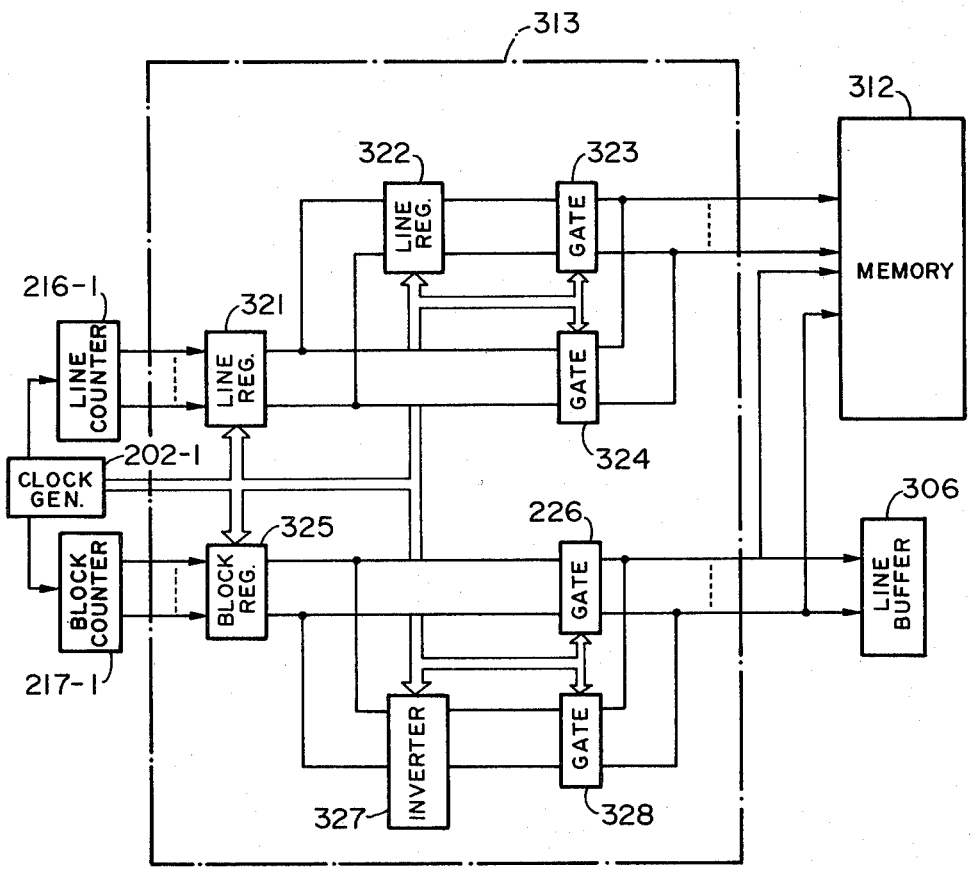
FIG. 7 shows further details of the block wiring diagram for the address circuit in FIG. 6.
Figure 8:
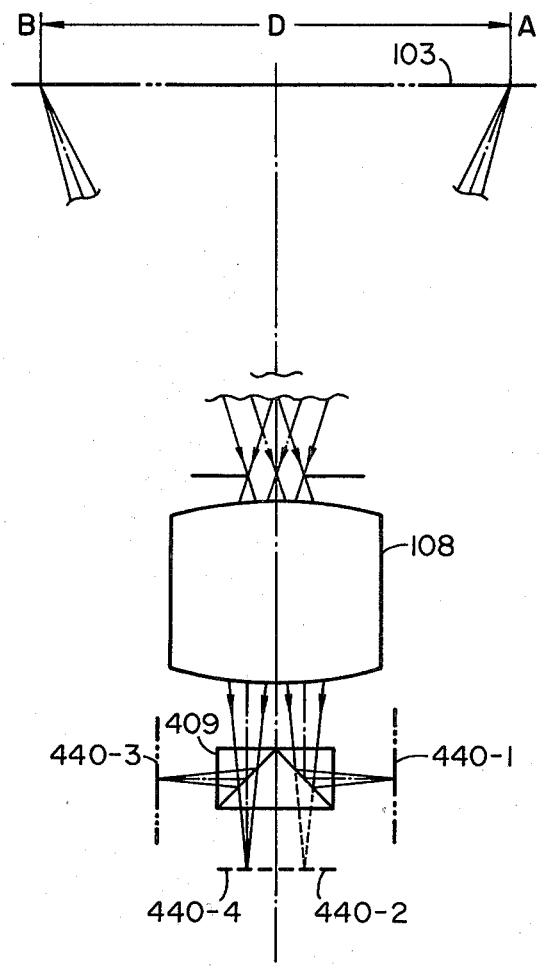
FIG. 8 is a side view showing a reading optical system according to another embodiment of the present invention.

FIG. 7 is a diagram for explaining details of a part of the address generating circuit in relation to the present invention. In the drawing, a value from the line counter 216-1 is once latched in a line register 321. On the other hand, the value is further latched by a line register 322 with a time delay for one line. Accordingly, the line register 322 always indicates a line number which is less by one line than the time of reading the memory is such that an output value of the line register 321 is produced by opening the gate 324. That is to say, an upper address value of the memory which is greater by 1 than the upper address value for writing is designated at the time of the reading. A value from the block counter 217-1 is held in a block register 325, the contents of which constitute the lower bit at the time of writing into the memory 312 and the line buffer 306. On the other hand, the lower address constituting the contents of the block register 325 is reversed by a bit reversing circuit 327. Accordingly, it is possible that the sequence of the address generation at the time of writing and reading of one line can be made opposite each other. Therefore, by effecting change-over of the address by the block register 325 and the address by the output from the bit reversing circuit 327 in accordance with writing and reading thereof at the time of returning motion of the image original, it is possible to reverse the sequence of the data for one line at the time of the return motion of the image original. At the time of the forward motion, both writing and reading uses either the block register 325 or the bit reversing circuit 327.

In the above-described embodiment, explanations have been made as to a case, wherein the red ink jet head is driven by the red signal read from the image original, and the black ink jet head is driven by the black signal read from the image original. Besides this, there may be a case, wherein various red marks and underlines in the image original are not required and desired to be erased, or a case, wherein black and white copy (monochromatic copy) is desired to be obtained from a color image original.

In the following, explanations will be made as to an embodiment of a recording device capable of arbitrarily selecting color to be recorded. In this embodiment, the beam splitter 109 and the light receiving elements 110-1, 110-2 as shown in FIG. 1 are replaced by a beam splitter 409 and light receiving elements 440-1 to 440-4. By simultaneously reading information at different positions on an image original, the memories 211, 312 as mentioned in the foregoing can be dispensed with.

The beam splitter 409 is composed of a dichroic mirror which transmits short wavelengths (blue side) in the visible light region, and reflects long wavelengths (red side).

The light receiving elements 440-1, 440-2 are disposed to read the information at a point B on the image original placing table, while the light receiving elements 440-3, 440-4 are disposed to read the information at a point A on the image original. Selection of the wavelength is done by the beam splitter 409 in such a manner that light in the long wavelength region may reach the light receiving elements 440-1, 440-3, while light in the short wavelength region may arrive at the light receiving elements 440-2, 440-4.

Accordingly, only the light information in the substantially long wavelength region is incident on the light receiving elements 440-1, 440-3, hence they are sensitive to both the red image original and the white background (where no image information exists), while only light information in the substantially short wavelength region is incident on the light receiving elements 440-2, 440-4, hence they are sensitive to the white background, but sensitive to both black and red image originals to a substantially negligible extent. That is, discrimination of the black and red image originals is done by a combination of the outputs from the light receiving elements, which can be recapitulated as follows.

TABLE 1

| | Black Original | Red Original | White Background |
|---|---|---|---|
| Light receiving elements 440-1, 440-3 (long wavelength region) | insensitive | sensitive | sensitive |
| Light receiving elements 440-2, 440-4 (short wavelength region) | insensitive | insensitive | sensitive |

In the device of FIG. 1, when the base 112 moves forward in the direction F in the drawing, the black recording head 125B in the recording section records on the recording paper in advance of the red recording head 125R. It is therefore sufficient that the black image original be read by the light receiving elements 440-1, 440-2 at the point B, while the red image original be read by the light receiving elements 440-3, 440-4 at the point A.

Figure 9:
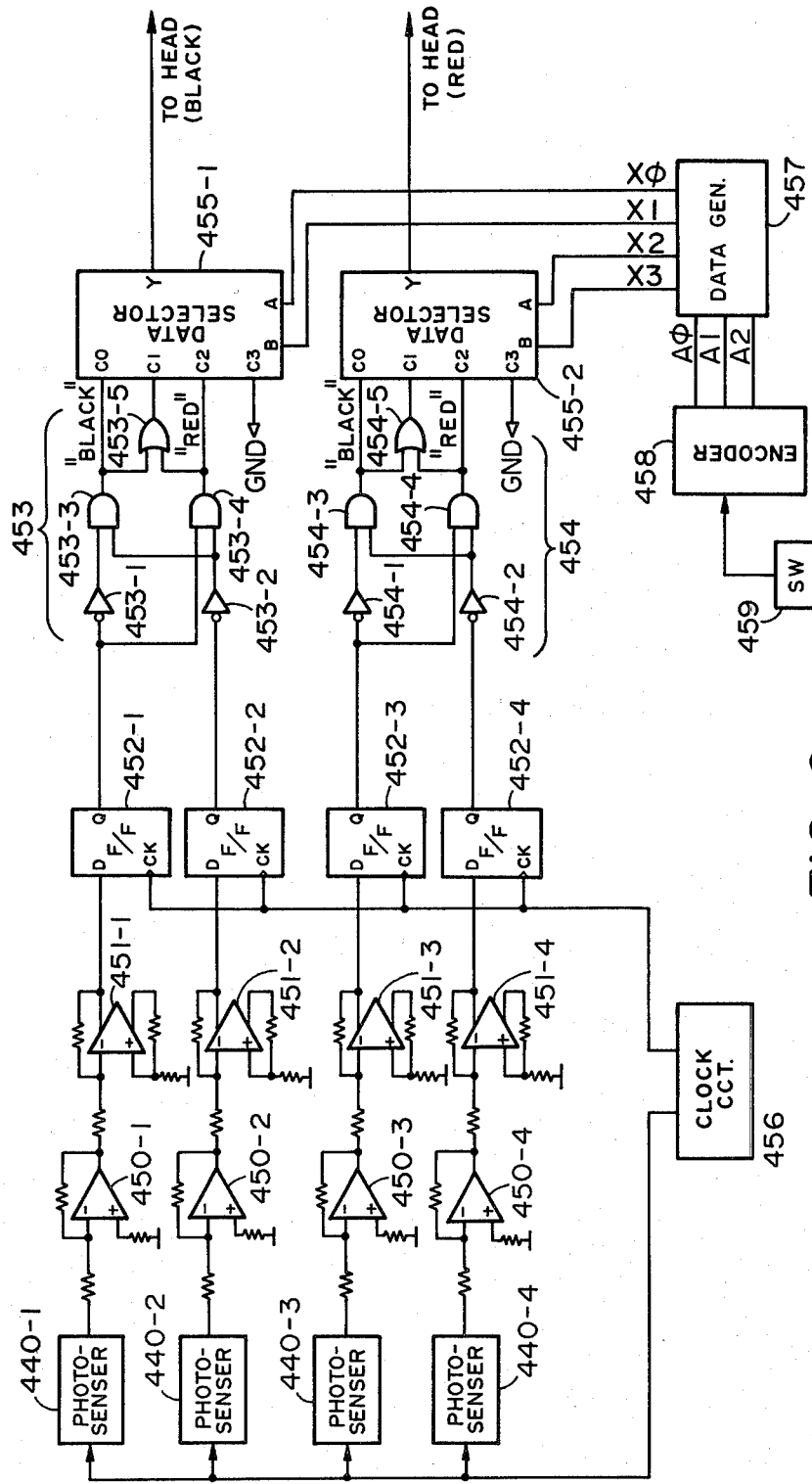
FIG. 9 is a block diagram showing another embodiment of the color signal forming circuit.

FIG. 9 is a schematic block diagram of the color information discriminating and selecting circuit to effect the present invention. Image information read by four light receiving elements 440-1, 440-2, 440-3, 440-4 such as, for example, CCD linear image sensors, etc., are amplified by respective amplifiers 450-1, 450-2, 450-3, 450-4. Thereafter, the presence or absence of sensitivity in each of the light receiving elements, i.e., the image information, is quantized by each of analog comparators 451-1, 451-2, 451-3, 451-4 (for the sake of simplicity in the explanations, the half tone recording is dispensed with, although this can be easily attained with a very slight modification of the concept of the present invention). The thus quantized data is then introduced as inputs into the D-input terminals of corresponding D-type flip-flops 452-1, 452-2, 452-3, 452-4 and are held in a flip-flop corresponding to a timing signal generated from a clock circuit 456. The image data thus quantized and held in the flip-flop are differentiated for black and red by a group of gate circuits 453, 454. In the operations of the red and black discriminating circuit, when the light receiving elements 440-1 through 440-4 have no sensitivity, outputs from the flip-flops 452-1 through 452-4 assume a low level, and, when they have sensitivity, the outputs assume a high level, an input into an AND gate 453-3 corresponds to outputs from the flip-flops 452-1, 452-2 inverted by the inverters 453-1, 453-2, respectively, hence the output from the AND gate 453-3 assumes a high level, only when the image original supplies the black information. Also, since an input into the AND gate 453-4 is a logical product of an output from the flip-flop 452-2 inverted by the inverter 453-2 and an output from the flip-flop 452-1, the AND gate 453-4 produces a high level output, only when the red information is supplied. On the other hand, since an input into the OR gate 453-5 is a logical sum of the outputs from the AND gates 453-3, 453-4, it produces a high level output in the case of either black or red information. (The same can be said of the group of the gate circuits 454.)

Color information discriminated by the groups of the gate circuits 453, 454 is introduced into input terminals of data selectors 455-1, 455-2. The data selectors 455-1, 455-2 have four input terminals C0, C1, C2, C3 and one output terminal Y. The black information from the AND gates 453-3, 454-3 is introduced into the input terminal C0, the black and red information from the OR gates 453-5, 454-5 into the input terminal C1, the red information from the AND gates 453-4, 454-4 into the input terminal C2, and the white information (GND=low level signal) into the input terminal C3. Any one of these input data is selected in accordance with signals from data selecting terminals A, B, and taken out as an output from the output terminal Y.

On the other hand, a copy mode selection switch 459 is able to select seven modes as shown in FIG. 10, for example, and the selected mode is encoded in a binary form by an encoding circuit 458 connected to the switch 459. The binary signal coded by the encoding circuit 458 is introduced into address input terminals Aφ, A1, A2, of a data generating circuit 457. The data generating circuit 457 consists, for example, of a P-ROM, and produces output data predetermined by input addresses Aφ, A1, A2 to output terminals Xφ, X1, X2, X3 thereof. These output data are introduced into the data selecting terminals A, B of the data selectors 455-1, 455-2, and the black and red image information are selected by a copy mode selection switch 459.

The copy mode selection switch 459, the data generating circuit 457, and the color recording modes of the image original are in a relationship as shown in FIG. 10. The image information selected by the copy mode selection switch 459 are produced as an output from the output terminal Y of the data selectors 455-1, 455-2. The output from the data selector 455-1 is forwarded to the drive circuit for the black ink jet head, while the output from the data selector 455-2 is set to the drive circuit for the red ink jet head.

In the foregoing, explanations have been made as to the preferred embodiment of the present invention, wherein, to avoid complexity in the explanations, the writing head constituting the writing section 102 adopts the ink jet head. It should, however, be noted that the present invention is not limited to this embodiment, but the writing section using a thermal head and other expedients may be combined with the reading section according to the present invention. Further, in the explanations, the dichromatic recording in black and red has been given as an example, but the invention is not limited to the use of black and red alone, and any other combination of two colors or more than two colors may be used for recording. Furthermore, the explanations have been made using a counter which increases every time a pulse input is introduced into the line counter and block counter. It is, of course, possible to use a counter whose count value decreases every time the input pulse is introduced into these line and block counters.

What we claim is:

1. An image recording device, comprising:
   color signal forming means for forming, by scanning an original image, a plurality of electrical color signals corresponding to a plurality of mutually different colors;
   a plurality of recording members for performing recording on a recording medium with colors corresponding to said plurality of different colors; and
   selection means to select whether said color signals are to be applied to one of said recording members in said colors corresponding to the different colors of said color signals, or whether they are to be applied in colors not corresponding to the different colors of said color signals, or whether one of said color signals is not to be applied to one of said recording members.

2. An image recording device as set forth in claim 1, wherein said selection means includes means for selectively prohibiting application of the color signals to said recording members.

3. An image recording device as set forth in claim 1, wherein each one of said recording members consists of an ink jet recording member.

4. An image recording device, comprising:
   color signal forming means for forming a plurality of color signals of an image;
   a plurality of recording members provided at different positions on a recording medium to record the image in a particular color;
   moving means to relatively move said recording medium and said recording members;
   memory means for storing color signals related to a selected color from said plurality of color signals;
   means to write color signals into write-into positions of said memory means and to read out said color signals stored in read-out positions spaced from said write-into positions by a predetermined value, wherein said write-into and read-out means delays the reading of said signals by time periods corresponding to the differences between the spacing of said positions;
   adjusting means for adjusting said time periods including means for adjustment of the distance between write-into positions and read-out positions in said memory means; and
   means for applying ones of said color signals which are not related to said selected color and color signals read from said write-into and read-out means to said recording members.

5. An image recording device as set forth in claim 4, wherein said device further comprises writing address determining means for determining an address for writing the color signals into said memory means.

6. An image recording device set forth in claim 5, wherein said writing address determining means includes resetting means to reset said writing address means when a predetermined address is reached.

7. An image recordinand backward for reading a plurality of different color signals from an image original;
   memory means for selecting and storing color signals from said plurality of color signals read during forward and backward movements of said image reading means;
   recording means provided with a plurality of recording members at different positions;
   means to write color signals into write-into positions of said memory means and to read out color signals stored in read-out positions spaced from said write-in positions by a predetermined value, wherein the reading of said stored color signals is delayed by time periods corresponding to the differences between the spacing of said write-into and read-out positions;
   first means for applying ones of said color signals which are not selected and stored in said memory means and which are read during forward movement of said image reading means and color signals read by said write-into and read-out means from said memory means to said recording members;
   second means for applying ones of said color signals read during the backward movement of said image reading means and which are not selected for storage in said memory means, and said color signals read by said write-into and read-out means from said memory means, to said recording members; and
   adjusting means for adjusting said time periods by adjustment of the distance between said write-into positions and said read-out positions in said memory means.

8. An image recording device as set forth in claim 7, wherein said write-into and read-out means includes address control means to render the opposite of an address sequence of said memory means between the forward movement and the backward movement of said image reading means.

9. An image recording device comprising:
   color signal forming means for forming a plurality of electrical color signals corresponding to a plurality of mutually different colors;
   recording means for recording on a recording medium with colors corresponding to said plurality of different colors; and
   selection means to select whether said color signals are developed in said colors corresponding to the different colors of said color signals, or whether they are developed in colors not corresponding to the different colors of said color signals, or whether one of said color signals is not developed.

* * * * *

UNITED STATES PATENT AND TRADEMARK OFFICE
CERTIFICATE OF CORRECTION

PATENT NO. : 4,467,348

DATED : August 21, 1984

INVENTOR(S) : MOTOHARU FUJII, ET AL.

It is certified that error appears in the above-identified patent and that said Letters Patent is hereby corrected as shown below:

COLUMN 2

Line 53, after "shows" insert --another embodiment of the record control--.

COLUMN 7

Line 45, after "block" insert --counter 217 supplies the address generating circuit 212 with information on block positions which are performing input and output operations. The contents of this block counter 217 are cleared by the--.

COLUMN 8

Line 42, after "out" insert --from--.

COLUMN 9

Line 35, after "bit." delete "ter 304" and insert --The black signal temporarily stored in the line buffer 306 is released with a timing which has been adjusted by a gate 307, and forwarded as an output therefrom to the drive circuit 308. The release timings of the shift clock of the shift register 304--.

COLUMN 10

Line 28, after "than the" insert --line register 321. The upper address at the time of writing in

UNITED STATES PATENT AND TRADEMARK OFFICE
CERTIFICATE OF CORRECTION

PATENT NO. : 4,467,348

DATED : August 21, 1984

INVENTOR(S) : MOTOHARU FUJII, ET AL.

It is certified that error appears in the above-identified patent and that said Letters Patent is hereby corrected as shown below:

COLUMN 10

Line 28 (Continued), the memory is such that an output value of the line register 322 is produced by opening the gate 323. The upper address at the--.

Signed and Sealed this

Ninth Day of July 1985

[SEAL]

Attest:

DONALD J. QUIGG

*Attesting Officer*      *Acting Commissioner of Patents and Trademarks*